US006818102B1

(12) United States Patent
Viol

(10) Patent No.: US 6,818,102 B1
(45) Date of Patent: Nov. 16, 2004

(54) METHOD FOR MODIFYING WOODEN SURFACES BY ELECTRICAL DISCHARGES AT ATMOSPHERIC PRESSURE

(76) Inventor: Wolfgang Viol, Heldaweg 11, D-37139 Adelebsen (DE)

( * ) Notice: Subject to any disclaimer, the term of this patent is extended or adjusted under 35 U.S.C. 154(b) by 317 days.

(21) Appl. No.: 10/148,505

(22) PCT Filed: Nov. 9, 2000

(86) PCT No.: PCT/EP00/11083

§ 371 (c)(1), (2), (4) Date: May 31, 2002

(87) PCT Pub. No.: WO01/39944

PCT Pub. Date: Jun. 7, 2001

(30) Foreign Application Priority Data

Dec. 1, 1999 (DE) ........................................ 199 57 775

(51) Int. Cl.[7] ................................................ B01J 19/08
(52) U.S. Cl. ...................................................... 204/164
(58) Field of Search .......................................... 204/164

(56) References Cited

U.S. PATENT DOCUMENTS 3,986,268 A * 10/1976 Koppelman .................. 34/257
4,821,900 A * 4/1989 Berker ....................... 215/355
5,215,637 A 6/1993 Williams .................... 204/164

FOREIGN PATENT DOCUMENTS

| | | |
|---|---|---|
| DE | 19718287 C1 | 6/1998 |
| EP | 0178907 | 4/1986 |

* cited by examiner

*Primary Examiner*—Kishor Mayekar
(74) *Attorney, Agent, or Firm*—Thomas, Kayden, Horstemeyer & Risley, LLP

(57) ABSTRACT

The invention relates to a method for modifying a wooden surface (7) where an electrode (1) is arranged opposite to the wooden surface (7) to be modified, and an alternating high voltage is applied to the electrode (1), in order to cause the discharge (11) between the wooden surface (7) and the electrode (1) under atmospheric pressure. A dielectric layer is arranged between the electrode (10) and the wooden surface as a counter-electrode (7) to be modified, and the alternating high voltage is applied with a frequency greater than 600 Hz.

10 Claims, 1 Drawing Sheet

METHOD FOR MODIFYING WOODEN SURFACES BY ELECTRICAL DISCHARGES AT ATMOSPHERIC PRESSURE

This application is a 371 National stage filing of international application PCT/EP00/11083 filed Nov. 9, 2000.

FIELD OF THE INVENTION

The invention relates to a method for modifying a wooden surface, an electrode being arranged opposite to the wooden surface to be modified, and an alternating high voltage being applied to the electrode, in order to cause a discharge between the electrode and the wooden surface under atmospheric pressure.

BACKGROUND OF THE ART

A method of the kind described at the beginning is known from U.S. Pat. No. 5,215,637. This document focuses on enhancing the bond properties of plastic surfaces with regard to adhesives, paints, coatings and the like. However, it is also mention, that other objects having a high dielectric constant such as ceramics, cardboard, paper and wood can be treated in the same way. In the known method an object having the surface to be modified is arranged between a pair of electrode plates to which reverse alternating high voltages of 125.000 Volt are applied, the difference voltage falling over an air gap of about 40 cm between the electrode plates. The frequency of the alternating high voltage is 60 Hz. By means of the applied alternating high voltages a corona-discharge is cost at atmospheric pressure which acts upon the surface to be modified. The corona discharge has a gore structure of the conducting plasma within the cross section of the air gap. To evenly distribute the conductive plasma in the corona-discharge over the cross section of the air gap between the electrode plates, the electrode plates are provided with perforated polyethylene shields. The perforations then each correspond to a discharge path between both electrode plates. Nevertheless in the known method there is a comparatively uneven modification of the surface to be modified by the effects of the plasma. This is particularly the case, if in deed a wooden surface is treated with the known method as wood typically has an inhomogen structure so that its dielectric properties are not evenly distributed over the wooden surface to be modified. As the result this means that some areas of the wooden surface are subject to a much stronger modification as other regions.

A method for modifying a wooden surface in which the wooden surface is removed layer by layer is known from DE 197 18 287 C1. Here, the surface to be modified is locally heated up by energy rich radiation so that a thin wood layer is suddenly heated up to such an extend that the essential part of the heated up volume is also suddenly evaporated and transformed into plasma. As energy-rich radiation particularly laser radiation may be taken into a count. In treating larger wooden surfaces the affords with regard to the apparatus for carrying out the known method are however very high. Because of principal reasons only a very small part of the wooden surface can be treated at each time to avoid an undesired heating up of the entire work piece.

This it is the problem of the invention to provide a method of the kind described at the beginning by which the wooden surface to be modified can be modified more evenly, and which, at the same time, can be carried out with large wooden surfaces within acceptable intervals of time at acceptable cost.

SUMMARY OF THE INVENTION

According to the invention this problem is solved in that a dielectric layer is arranged between the electrode and the wooden surface to be modified and in that the alternating high voltage is applied with a frequency of more than 600 Hz.

The first feature of the new method results in a dielectric hindered discharge being caused which acts upon the wooden surface to be modified. As compared to a corona-discharge, a dielectric hindered discharge is principally indicated by a much finer distribution of the plasma, i.e. of the actual discharge areas over the whole cross section covered by the discharge. The alternating high voltage having a frequency of more then 600 Hz also contributes to the fine distribution of the plasma. All at all the desired homogenous modification of the wooden surface is achieved. At the same time the cost of carrying out the new method are limited. The energy input is in the order of 1 kWh per mo$^2$ wooden surface, and can thus be estimated as comparatively low.

The new method is not only applicable to enhance the bond of different coatings to the wooden surface, which already includes coating with enhancive and thus gluing together via the wooden surface. The modification of the wooden surface can also be conducted as a upgrading step for the wooden surface which is not followed by a coating of the wooden surface. This includes, for example, removing loose or damaged parts of the wooden surface, which is desirable after sawing or during restoration of wooden work pieces. Further, also a preservation of the wooden surface can be effected by the method according to the invention.

To achieve the respective desired effects by modifying the wooden surface, the atmosphere in which the discharge between the wooden surface and the electrode is caused may be modified with regard to normal air by adding certain gases. This is particularly valid, if this gases are to be intercalated into the wooden surface to be modified. The gas mixtures desired in each particular case can simply be blown into the zone of the discharge as it takes place under atmospheric pressure. A thermal stress of the wooden surface does not take place during the new method. The gas temperature in the area of the discharge does not essentially rise above room temperature.

In the new method, a piece of wood having the wooden surface to be modified can be connected to the ground as the counter electrode for the electrode. I.e. for carrying out the new method only a single further electrode is necessary besides the piece of wood having the wooden surface to be modified. The conductive properties of wood are sufficient for forming the counter electrode.

A piece of wood having the wooden surface to be modified can however, also arranged on a plan counter electrode arranged in parallel to the plan electrode. In this case the piece of wood has the effect of a second dielectric layer in front of the counter-electrode. I.e., in this case the dielectric properties of the wood are dominant is compared to its conductivity.

In a preferred embodiment of the new method a piece of wood having the wood surface to be modified is moved on a conveyor belt made of dielectric material over a plane counter-electrode arranged in parallel to the plane electrode. Here, both electrodes, i.e. the electrode facing the wooden surface to be modified in the counter-electrode stands still and the piece of wood is transported there between. Here, the conveyor belt for the piece of wood at the same time surfs at a dielectric layer in front of the counter-electrode.

In modifying very large wooden surfaces to be modified it is suitable to move the electrode with regard to a piece of wood having the wooden surface to be modified, i.e. in parallel to the wooden surface to be modified. Moving the electrode with regard to the piece of wood can either be accomplished by moving the piece of wood having the wooden surface to be modified or the electrode itself.

If the surface of the electrode facing the wooden surface to be modified is small as compared to the surface of the wooden surface to be modified, even strongly contoured wooden surfaces can be scanned under defined discharge conditions to accomplish the desired modification of the wooden surface.

Preferably the surface of the electrode as compared to the surface of the wooden surface to be modified is dimensioned in the new method in such a way that the wooden surface to be modified covers at least 90% of the cross section of the discharge. With other words, the discharge power is used in the new method as far as possible for the desired modification of the wooden surface. As little discharge power as possible shall be consumed besides the wooden surface to be modified, i.e. directly between the electrode a counter-electrode.

To achieve a particularly good distribution of the plasma of the discharge over the wooden surface to be modified, the alternating high voltage is preferable applied with a frequency of over 5 kHz, i.e. preferably of 10 to 3000 kHz, in the new method.

Here, it is particularly preferred, if the alternative high voltage is consisting of single high voltage pulses, the distance of which is greater then their duration. For example, the distance of the single high voltage pulses can be correspond to a frequency in the range of 10 to 20 kHz, whereas the duration of the single high voltage pulses may comprise frequency components in the range of over 500 kHz.

If, in the new method, the alternating high voltage is applied to the electrode with alternating polarity, the building up of charges both at the dielectric layer in front of the electrode and at the wood surface to be modified is avoided.

The distance of the electrode with the dielectric layer from the wooden surface to be modified is typically between 1 and 25 mm in the new method. I.e., this distance is not critical. It is to be understood, however, that with increasing distance the alternating high voltage has to be raised. Typical values for the alternating high voltage are 30 to 50 kV with single high voltage pulses. In case of a sinusoidal high voltage, the frequency of which can also be in a range of above 100 kHz, for example between 100 and 3,000 kHz, the alternating high voltage is typically 10 to 15 kV.

DESCRIPTION OF THE DRAWINGS

In the following the invention is further explained and described by means of embodiment examples, here

DETAILED DESCRIPTION OF THE INVENTION

Figure 1:
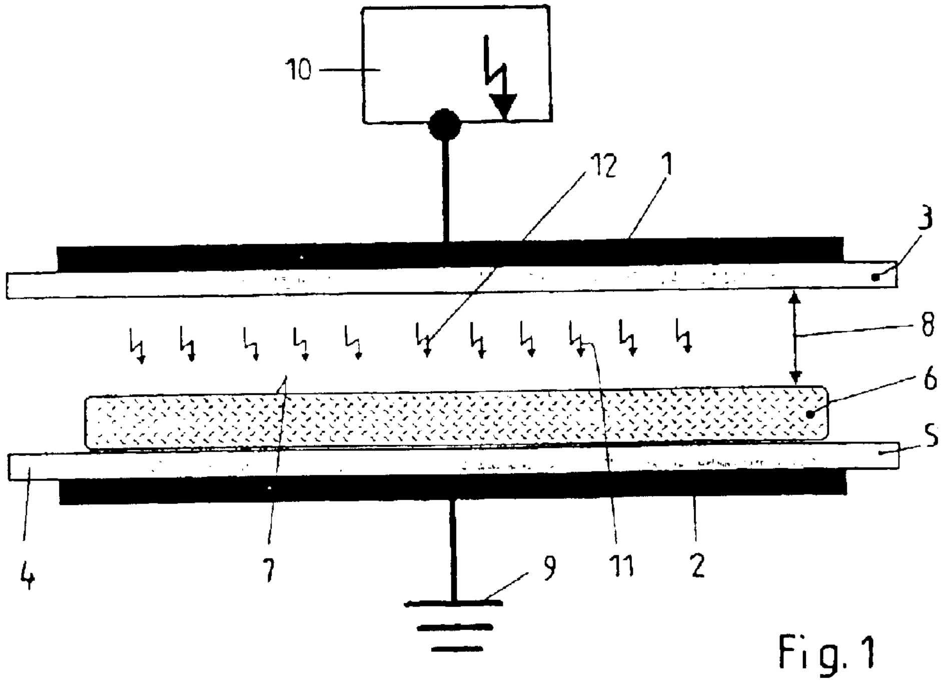
FIG. 1 shows a first principal arrangement for carrying out a new method.

FIG. 1 shows a plan, i.e. plate shaped electrode 1 and an also plan, i.e. plate shaped counter-electrode 2, which are arranged in parallel to each other. In front of the electrode 1 there is a dielectric layer 3. A conveyor belt 4 made of dielectric material 5 runs over the counter-electrode 2. A piece of wood 6, wooden surface 7 of which is facing the dielectric layer 3 or the electrode 1, respectively, is placed on the conveyor belt 45. Here, a distanced 8 is given between the dielectric layer 3 and the wooden surface 7. Whereas the counter-electrode 2 is connected to earth 9, the electrode 1 is connected to a high voltage power supply 10. The high voltage power supply 10 is based on semi conducted techniques. It is a trade standard and has both good efficiency of 80 to 90% and is available at compared little cost. By means of the high voltage power supply 10 a alternating high voltage is applied to the electrode 1 which causes a dielectrically hindered discharge 11 between the dielectric layer 3 and the wooden surface 7 under atmospheric pressure. The distribution of the plasma 12 in the area of the dielectric discharge 11 is homogenous so that its effect is even over the wooden surface 7 of the wood piece 6 because of the fact that the electrical discharge is dielectrically hindered and due to the fact that the alternating high voltage which is applied to the electrode 1 has at least an order of 1 kHz.

Figure 2:
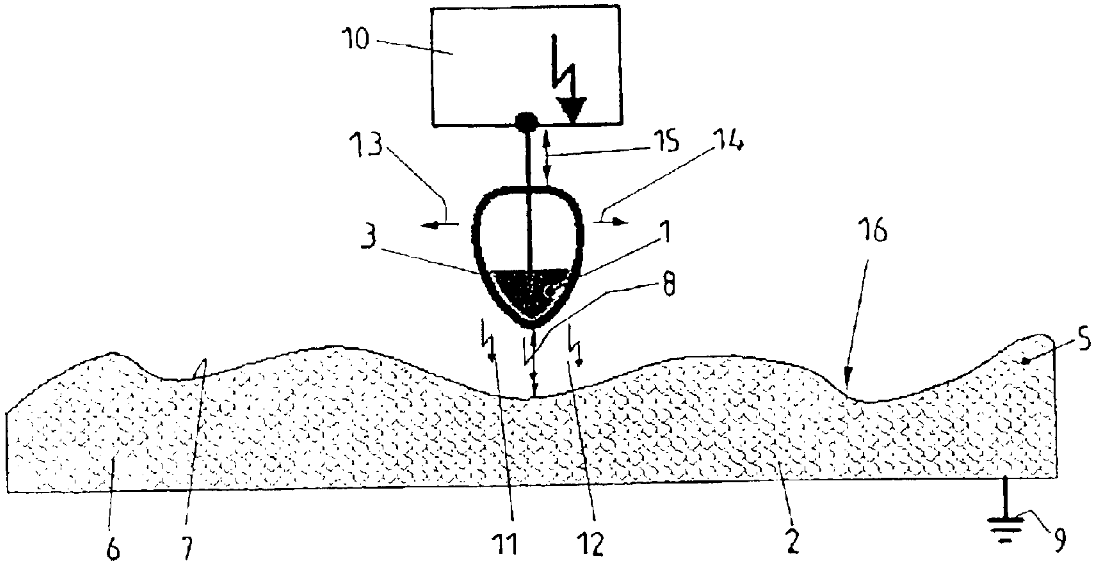
FIG. 2 shows a second principal arrangement for carrying out a new method.

According to FIG. 2 the electrode 1 is only small with regard to its surface facing the wooden surface 7, and it is totally covered by the dielectric layer 3. Further, the electrode 1 provided for being moved in parallel to the wooden surface 7 which is indicated by arrows 13 to 15. Thus, the wooden surface 7 is scanned with the electrode 1 to evenly modify in all areas despite its distinctive contour here. Further the arrangement of FIG. 2 differs from that one in FIG. 1 in that no separate counter-electrode with a dielectric material 5 being arranged in front of it is provided here. Instead, the piece of wood 6 is directly connected to earth 9, and thus, also has the function of the counter-electrode 2 and the dielectric material according to FIG. 1.

The distance 8 according to FIGS. 1 and 2 can be 1 to 25 mm. Typically it is in the area of a few millimeters. The following indications for the alternating high voltage, with which the new method has successfully been tested, are related there too.

In the first case it is a sinusoidal alternating high voltage of 10 to 15 kV having a frequency between 100 kHz and 3 MHz.

In a second case, which revealed particularly good result in the modification of the wooden surface 7, it is a alternating high voltage comprised of separate high voltage pulses of 40 to 50 kV with a pulse duration of 2 $\mu$s which corresponds to a frequency of 500 kHz and with a pulse frequency of 10 to 17 kHz. This means that the duration of the high voltage pulses was much smaller then their time distance. The preferred high voltage pulses where pulse serious of alternating polarity at the electrode 1.

The advantages achievable with a new method for modifying a wooden surface 7 are explained in the following by means of single application examples.

Cleaning

A thin wood layer can be removed from the wooden surface to be modified, the structure of this thin wood layer may be destroyed by a previous mechanical processing and they only have a loose bond to the massive wood. Such a mechanical processing is, for example a sawing step by which the wooden surface 7 to be modified has been produced. Besides the cleaning of the wooden surface 7 also pores between the wood fibers are opened by the method according to the invention.

Gluing

By means of the new method the thin wood layer injured by a mechanical pre processing is removed as described above under "Cleaning", and the physical and chemical surface properties are amended so that a better connection of adhesive and massive wood and thus a better bonding strength is achieved. Because of the bad strength of gluing of grain-cut timber, for example in block boards, presently in denting of the wood pieces is necessary. By means of the modification of the wooden surface 7 according to the invention a higher bonding strength can be achieved, so that, depending of the load, in denting of the wood pieces can be avoided. Depending of the contour of the surface to be modified before the treatment according to the invention a planning step before gluing of the block boards can also be avoided.

Coating

As described under Cleaning, above, a thin wood layer is removed by means of the new method, the structure of which has been injured by a previous mechanical processing and which thus only has a loose bond to the massive wood. Additionally, pores between the wood fibers are opened, so that coatings, for example paints, are better ensured.

Additionally, reactive gases may be introduced between the electrodes 1, 2, so that the wood is coated out of the plasma 12 or subjected to a chemical reaction. The coating applied in this way and all the reaction started in this way and all the reaction started in this way can already be the end processing of the wooden surface 7 to be modified.

Preservation

By means of the modification of the wooden surface 7 according to the invention its wetting property can be affected. By means of pulse discharges the wooden surface 7 can also be compacted. Starting with a density of 1.4 g/cm$^3$, for example, taking up of water via the wooden surface 7 can nearly be stopped. This results in a very environmental friendly method of wood preservation.

Bleaching

In case of a white paint on wooden surfaces, wood inherent substances often penetrate into the paints so that the white paints becomes yellow and brown speckles become visible with time. By means of the modification of the wooden surface 7 according to the invention, wood inherent substances which are responsible for theses effects are bleached out or immobilized before the white paint is applied to the wooden surface. To this end, the method according to the invention is to be modified so that oxygen is introduced in the area of the dielectrically hindered discharge. By means of the discharge atomic oxygen or ozone are produced which result in bleaching the undesired wood inherent substances. This bleaching effect can also be achieved by producing of ultra violet light in the dielectrically hindered discharge. At the same time, by choosing other parameters it can be cared for that now oxidation of the wooden surface as such takes place.

LIST OF REFERENCE NUMERALS

Electrode—1
Counter-electrode—2
Dielectric layer—3
Conveyer belt—4
Dielectric material—5
Wood piece—6
Wooden surface—7
Distance—8
Earth—9
High voltage power supply—10
Discharge—11
Plasma—12
Arrows—13 to 15
Contour—16

What I claim is:

1. A method for modifying a wooden surface of a piece of wood, the method comprising the steps of:

arranging an electrode opposite to the wooden surface to be modified;

arranging a dielectric layer between the electrode and the wooden surface to be modified;

and applying an alternating high voltage to the electrode, the alternating high voltage having a frequency of more than 600 Hz, and the piece of wood having the wooden surface to be modified being used as a counter-electrode for the electrode, in order to cause a dielectric-barrier discharge between the wooden surface and the electrode at atmospheric pressure.

2. The method of claim 1, wherein the piece of wood having the wooden surface to be modified is grounded.

3. The method of claim 1, wherein the piece of wood having the wooden surface to be modified is conveyed on a conveyer belt made of dielectric material over a further plane counter-electrode arranged in parallel with the electrode.

4. The method of claim 1, wherein the electrode is moved with regard to the piece of wood having the wooden surface to be modified in parallel to the wooden surface to be modified.

5. The method of claim 4, wherein the surface of the electrode which is facing the wooden surface to be modified is small as compared to the surface of the wooden surface to be modified.

6. The method of claim 1, wherein the surface of the electrode is dimensioned with regard to the surface of the wooden surface to be modified in such a way that the wooden surface to be modified covers at least 90% of a cross sectional area of the discharge.

7. The method of claim 1, wherein the alternating high voltage is applied with a frequency of 5 to 3000 kHz.

8. The method of claim 1, wherein the alternating high voltage is comprised of single high voltage pulses, the distance between the pulses of which is greater than their duration.

9. The method of claim 1, wherein the alternating high voltage is applied with alternating polarity.

10. The method of claim 1, wherein the electrode having the dielectric layer is arranged at a distance of 1 to 25 mm to the wooden surface to be modified.

* * * * *